(12) United States Patent
Kim (10) Patent No.: US 8,413,071 B2
(45) Date of Patent: Apr. 2, 2013

(54) IMAGE PROCESSING APPARATUS AND METHOD

(75) Inventor: Yun-il Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 12/791,918

(22) Filed: Jun. 2, 2010

(65) Prior Publication Data

US 2011/0066975 A1 Mar. 17, 2011

(30) Foreign Application Priority Data

Sep. 15, 2009 (KR) .................. 10-2009-0087252

(51) Int. Cl.
*G06F 3/048* (2006.01)

(52) U.S. Cl. .................. 715/810; 715/811; 715/778

(58) Field of Classification Search .................. 715/810, 715/811, 778
See application file for complete search history.

(56) References Cited

U.S. PATENT DOCUMENTS

| | | | |
|---|---|---|---|
| 5,699,534 A | 12/1997 | Barber et al. | |
| 6,148,406 A * | 11/2000 | Weisz et al. | 726/18 |
| 6,774,868 B1 * | 8/2004 | Bowen | 345/1.1 |
| 7,296,233 B2 * | 11/2007 | Tan et al. | 715/741 |
| 7,333,602 B2 * | 2/2008 | Habu | 379/368 |
| 7,395,506 B2 * | 7/2008 | Tan et al. | 715/741 |
| 7,698,563 B2 * | 4/2010 | Shin | 713/184 |
| 8,010,797 B2 * | 8/2011 | Watari | 713/183 |
| RE43,082 E * | 1/2012 | Gutowitz | 341/22 |
| 8,176,324 B1 * | 5/2012 | Krishnamurthy | 713/168 |
| 8,191,126 B2 * | 5/2012 | Raghavan | 726/7 |
| 2003/0146931 A1 | 8/2003 | Cheol-Shin et al. | |
| 2004/0010690 A1 * | 1/2004 | Shin et al. | 713/176 |
| 2005/0160297 A1 * | 7/2005 | Ogawa | 713/202 |
| 2007/0169174 A1 * | 7/2007 | Critten et al. | 726/3 |
| 2010/0313156 A1 * | 12/2010 | Louch et al. | 715/769 |
| 2011/0066975 A1 * | 3/2011 | Kim | 715/810 |
| 2012/0005734 A1 * | 1/2012 | Ogawa | 726/6 |

FOREIGN PATENT DOCUMENTS

| | | |
|---|---|---|
| WO | 01/99338 A1 | 12/2001 |
| WO | 02/39656 A1 | 5/2002 |
| WO | 2004/027632 A1 | 4/2004 |

OTHER PUBLICATIONS

Extended European Search Report issued on Nov. 10, 2010 in counterpart European Patent Application No. 10166651.9.

* cited by examiner

*Primary Examiner* — David Phantana Angkool (74) *Attorney, Agent, or Firm* — Sughrue Mion, PLLC (57) ABSTRACT

An image processing apparatus and an image processing method are provided. The image processing apparatus includes: a video processor which processes and displays an image; a receiver which receives a user's selection; and a controller which controls the video processor to display a plurality of password input screens each including a plurality of keys, display a key corresponding to the user's selection on a selected password input screen, and display a random key on at least one other password input screen from the plurality of password input screens which is different from the selected password input screen.

16 Claims, 9 Drawing Sheets

IMAGE PROCESSING APPARATUS AND METHOD

CROSS-REFERENCE TO RELATED APPLICATION

This application claims priority from Korean Patent Application No. 10-2009-0087252, filed Sep. 15, 2009 in the Korean Intellectual Property Office, the disclosure of which is incorporated herein by reference in its entirety.

BACKGROUND

1. Field

Apparatuses and methods consistent with exemplary embodiments relate to image processing, and more particularly to image processing in which a user's account password can be securely input through a limited input device in an environment in which a screen is shared by a plurality of users.

2. Description of the Related Art

Users may input their account passwords through a virtual input device displayed on a screen.

For example, a user may use up, down, left, and right arrow keys to move to a letter to be selected on a screen keyboard. When the letter is input, a symbol "●" may be displayed in a password input box so that a user may ascertain whether the selected letter is input.

By displaying the symbol "●" instead of the input letters in the password input box, the input letters may be prevented from being visible to a third party. However, a third party may identify the input letter by matching an input time of the symbol "●" and a position of a cursor because the cursor is positioned on the letter selected by a user. For example, to input a letter "a," a user has to move the cursor to a position of "a" 105 and press an input key. Therefore, if the symbol "●" is input in a state that the cursor is positioned in the letter "a" 105, a third party can read that the latter "a" is input.

Accordingly, if the letter selected by a user is shown on the screen keyboard and the symbol "●" is displayed for letting a user to know that the selected letter is input, a currently input password may be obtained by the persons around a user or a third party who shares the screen with the user.

SUMMARY

According to one or more exemplary embodiments, there is provided an image processing apparatus and method in which a user's account password may be securely input through a limited input device under an environment that a screen is shared among a plurality of users like a television.

According to an aspect of an exemplary embodiment, there is provided an image processing apparatus including: a video processor which processes and displays an image; a receiver which receives a user's selection; and a controller which controls the video processor to display a plurality of password input screens including a plurality of keys, display a key selected corresponding to the user's selection among the plurality of keys on a selected password input screen, and display a random key on at least one password input screen among the password input screens except the selected password input screen.

The controller may control the video processor to display cursors at a position of a key corresponding to the user's selection and at a position of the random key.

The controller may control the video processor to move the cursor displayed on the selected password input screen in response to the user's selection, but to randomly move the cursors displayed on at least one password input screen among the password input screens except the selected password input screen.

The controller may control the video processor to display the cursors to have different initial positions according to password input screens, respectively.

The controller may control the video processor to synchronize a displaying time of a key selected corresponding to the user's selection with the displaying time of the random key.

The controller may control the video processor to display the plurality of password input screens at the same time.

The controller may control the video processor to mask and display a key selected corresponding to the user's selection and the random key.

The controller may randomly draw out the random key.

The controller may control the video processor to set the plurality of password input screens to be different in at least one of a number, a color and a label.

The controller may set up the password input screen corresponding to at least one of a color, a number and a label corresponding to the user's selection as the selected password input screen.

According to an aspect of another exemplary embodiment, there is provided an image processing method including: displaying a plurality of password input screens including a plurality of keys; receiving a user's selection; and displaying a key selected corresponding to the user's selection among the plurality of keys on a selected password input screen, and displaying a random key on at least one password input screen among the password input screens except the selected password input screen.

Cursors may be displayed at a position of a key corresponding to the user's selection and at a position of the random key.

The cursor displayed on the selected password input screen may be moved in response to the user's selection, but the cursors displayed on at least one password input screen among the password input screens except the selected password input screen may be moved randomly.

The cursors may be displayed to have different initial positions according to password input screens, respectively.

A displaying time of a key selected corresponding to the user's selection may be synchronized with the displaying time of the random key.

The plurality of password input screens may be displayed at the same time.

A key selected corresponding to the user's selection and the random key may be masked and displayed.

The random key may be randomly drawn out.

The plurality of password input screens may be set up to be different in at least one of a number, a color and a label.

The password input screen corresponding to at least one of a color, a number and a label corresponding to the user's selection may be set up as the selected password input screen.

BRIEF DESCRIPTION OF THE DRAWINGS

The above and other aspects will become apparent and more readily appreciated from the following description of the exemplary embodiments, with reference to the accompanying drawings, in which.

DETAILED DESCRIPTION

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
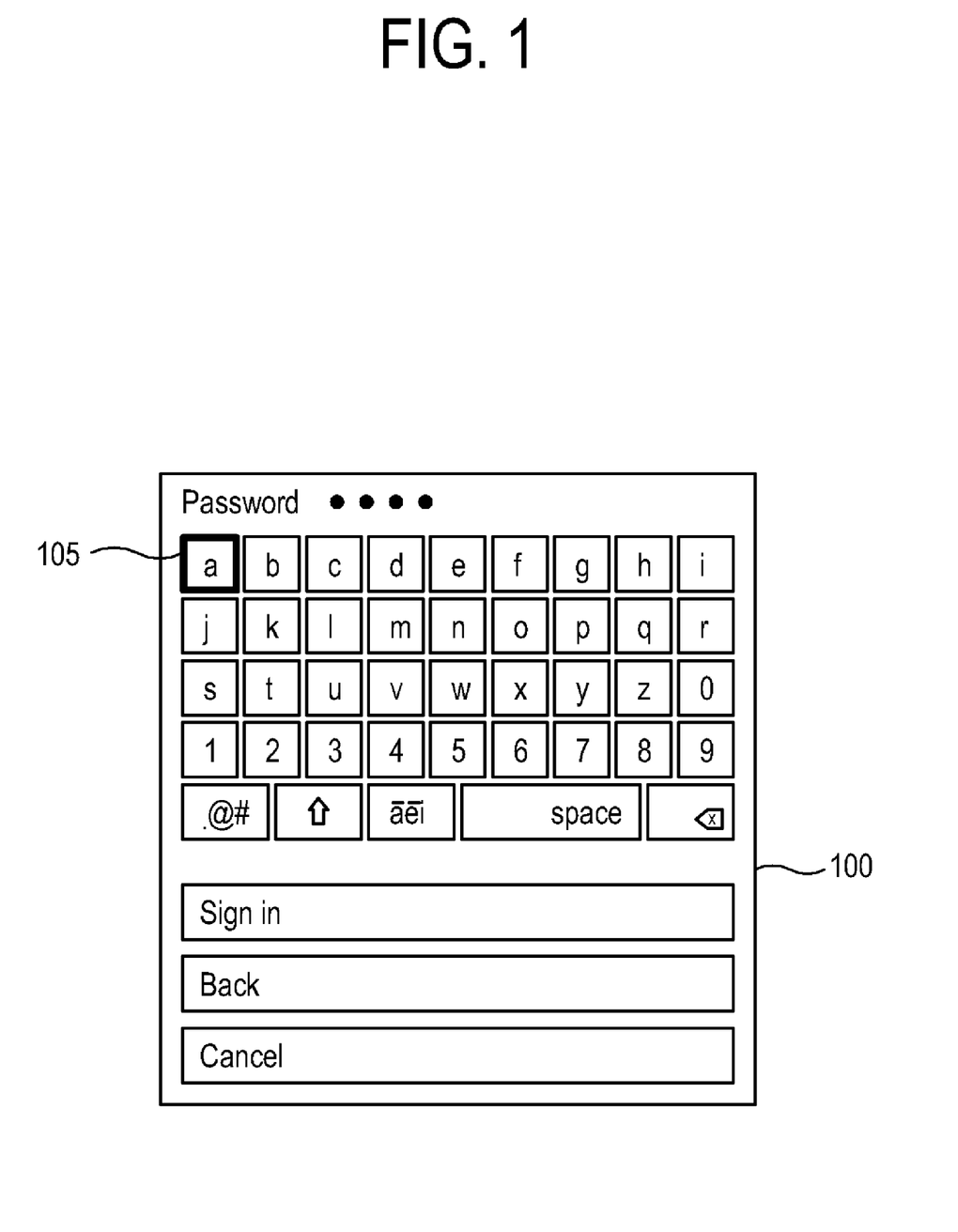
FIG. 1 is a view for explaining a method of inputting a password through the virtual input device.

FIG. 1 is a view for explaining a method of inputting a password through the existing virtual input device. A user may use up, down, left, and right arrow keys to move to a letter to be selected on a screen keyboard 100 shown in FIG. 1, and selects and input the letter. For example, to input a letter "a," a user has to move the cursor to a position of "a" 105 and press an input key. When the letter is input, a symbol "●" may be displayed in a password input box so that a user may ascertain whether the selected letter is input.

Figure 2:
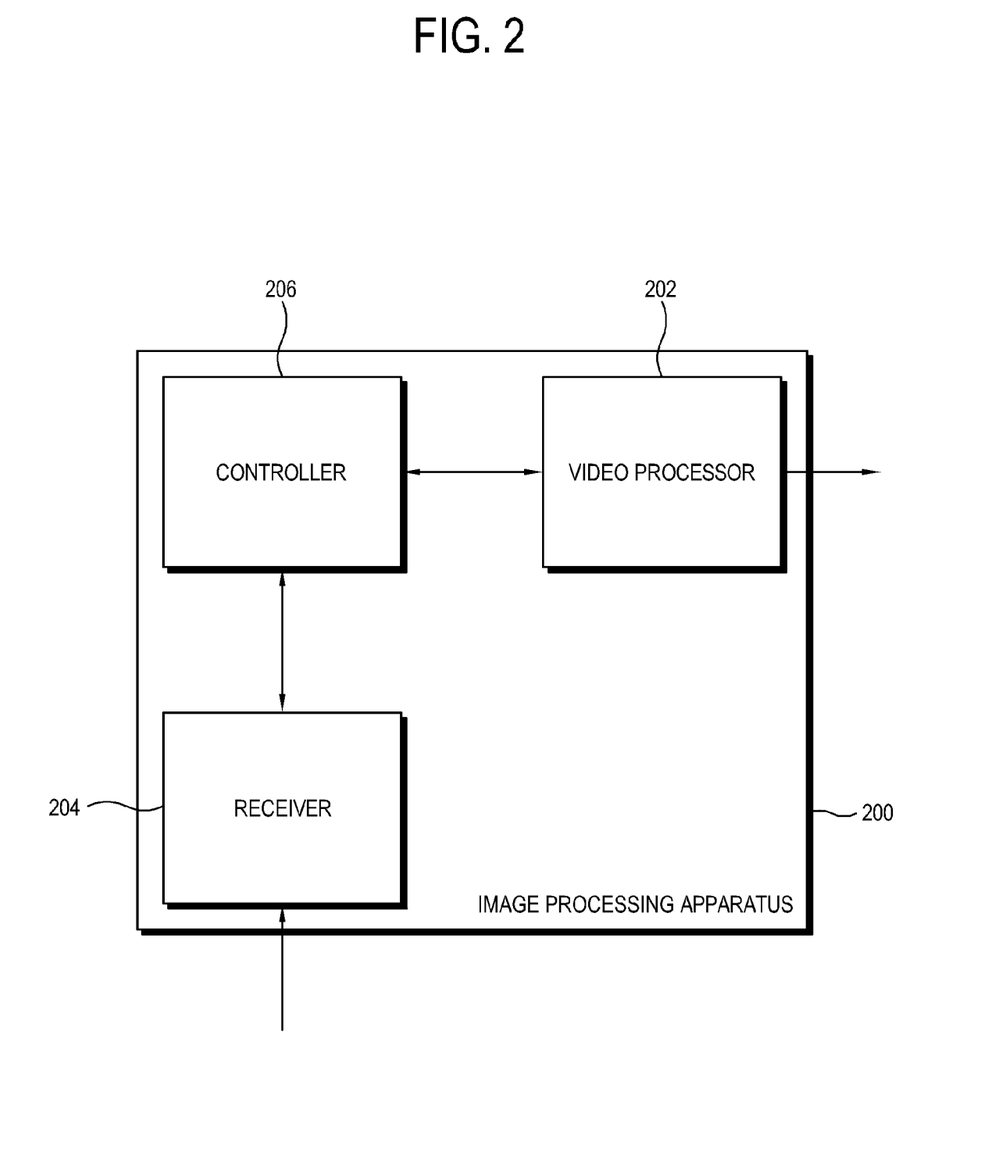
FIG. 2 is a block diagram of an image processing apparatus according to an exemplary embodiment.

FIG. 2 is a block diagram of an image processing apparatus according to an exemplary embodiment.

According to an exemplary embodiment, an image processing apparatus 200 may include a television (TV), a personal computer (PC), a monitor, a set-top box, a digital versatile disc (DVD) player, etc. Further, the image processing apparatus 200 according to an exemplary embodiment may include other types of electronic apparatuses which may be controlled through a limited input device.

In this exemplary embodiment, the image processing apparatus 200 may include a video processor 202, a receiver 204, and a controller 206.

The video processor 202 may process an image to be displayed. Specifically, the video processor 202 may display a password input screen. The password input screen may include at least one of a virtual keyboard, a virtual keypad, and other appropriate virtual input devices. Also, a password may include at least one of a password for turning on/off the image processing apparatus 200, and a password for implementing a function of the image processing apparatus 200.

The video processor 202 may include a liquid crystal display (LCD), an organic light emitting diode (OLED) display, a plasma display panel (PDP), etc.

The receiver 204 may receive a user's selection. Specifically, the receiver 204 may receive a key signal or pointing information from the input device such as a remote controller, a laser pointer, etc. A user may input a selected key through the input device. Also, the receiver 204 may receive a key signal or the like through a key button or the like provided in the image processing apparatus 200.

The controller 206 may control the video processor 202 to display a plurality of password input screens with a plurality of keys.

Thereafter, if a user inputs a password on the password input screen, the controller 206 may control the video processor 202 to display a key selected by the receiver 204 among the plurality of keys on a selected password input screen, and display random keys on at least one other password input screen different from the selected password input screen. The controller 206 may control the video processor 202 to display the key selected by the receiver 204 and the random key as the masked keys. Specifically, a masking process may include a process in which at least one of symbols "●," "○," and "*" is displayed instead of the input letter.

The controller 206 may randomly draw out the random key.

According to an exemplary embodiment, the controller 206 may control the video processor 202 to display cursors at a position of the key corresponding to a user's selection and at positions of the random keys. The controller 206 may control the video processor 202 so that the cursor displayed on the selected password input screen moves in response to a user's selection, and the cursor displayed on at least one other password input screen moves randomly. Also, the controller 206 may control the video processor 202 so that the plurality of password input screens may be different in an initial position of the cursor from one another.

Alternatively, the controller 206 may control the video processor 202 to display highlights at a position of the key corresponding to a user's selection and at positions of the random keys. The controller 206 may control the video processor 202 so that the highlight displayed on the selected password input screen moves in response to a user's selection, and the highlight displayed on at least one other password input screen moves randomly. Also, the controller 206 may control the video processor 202 so that the plurality of password input screens may be different in an initial position of the highlight from one another.

The controller 206 may control the video processor 202 so that a displaying time of the key selected by a user is synchronized with that of the random key.

The controller 206 may control the video processor 202 to display the plurality of password input screens at the same time. Alternatively, the controller 206 may control the video processor 202 to display the plurality of password input screens in a sequence.

The controller 206 may control the video processor 202 so that the plurality of password input screens may be different from one another in at least one of numbers superposed on the password input screens, colors of the password input screens, and labels superposed on the password input screens. The controller 206 may set the password input screen, which corresponds to at least one of the color, the number, and the label according to a user's selection, as the selected password input screen.

Figure 3A:
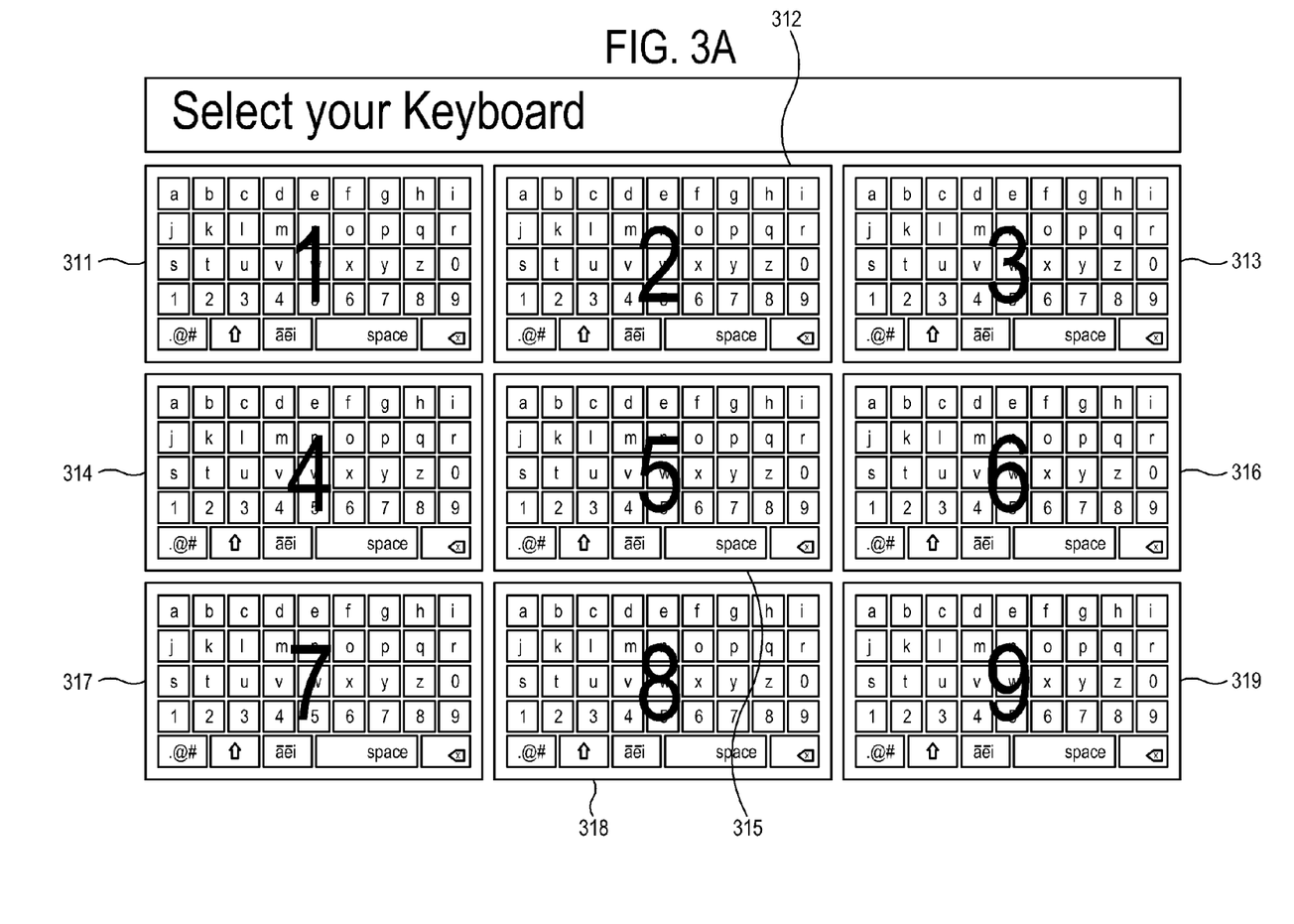
FIG. 3A shows a plurality of password input screens set to be different by a number.

FIG. 3A shows a plurality of password input screens are set to have different numbers superposed thereon.

When a user wants to input a password, the image processing apparatus 200 may display the plurality of password input screens.

The password input screens may have the same key arrangement or the key arrangements different from one another. The plurality of password input screens shown in FIG. 3A have the same key arrangement, but such arrangement is not limited thereto. Alternatively, the plurality of password input screens may each have a random key arrangement.

Further, the plurality of password input screens may be numbered differently. Referring to FIG. 3A, each of the password input screens is assigned a different number. For example, a password input screen 311 is assigned the number 1, a password input screen 312 is assigned the number 2, a password input screen 313 is assigned the number 3, a password input screen 314 is assigned the number 4, a password input screen 315 is assigned the number 5, a password input screen 316 is assigned the number 6, a password input screen 317 is assigned the number 7, a password input screen 318 is assigned the number 8, and a password input screen 319 is assigned the number 9.

A user may select a selected password input screen for actually inputting a password through the numbers assigned to the plurality of password input screens. Specifically, a user may input a desired number through the input device. Here, the image processing apparatus 200 may set a password input screen having a number corresponding to a user's desired number as the selected password input screen. For example, when a user inputs "5" through the input device, the password input screen 315 is set up as the selected password input screen for actually inputting a password. The other password input screens 311, 312, 313, 314, 316, 317, 318, 319 except the selected password input screen are not used for actually receiving the password from a user but instead for receiving virtual passwords. Thus, the image processing apparatus 200 has one actual input screen and eight virtual input screens.

Figure 3B:
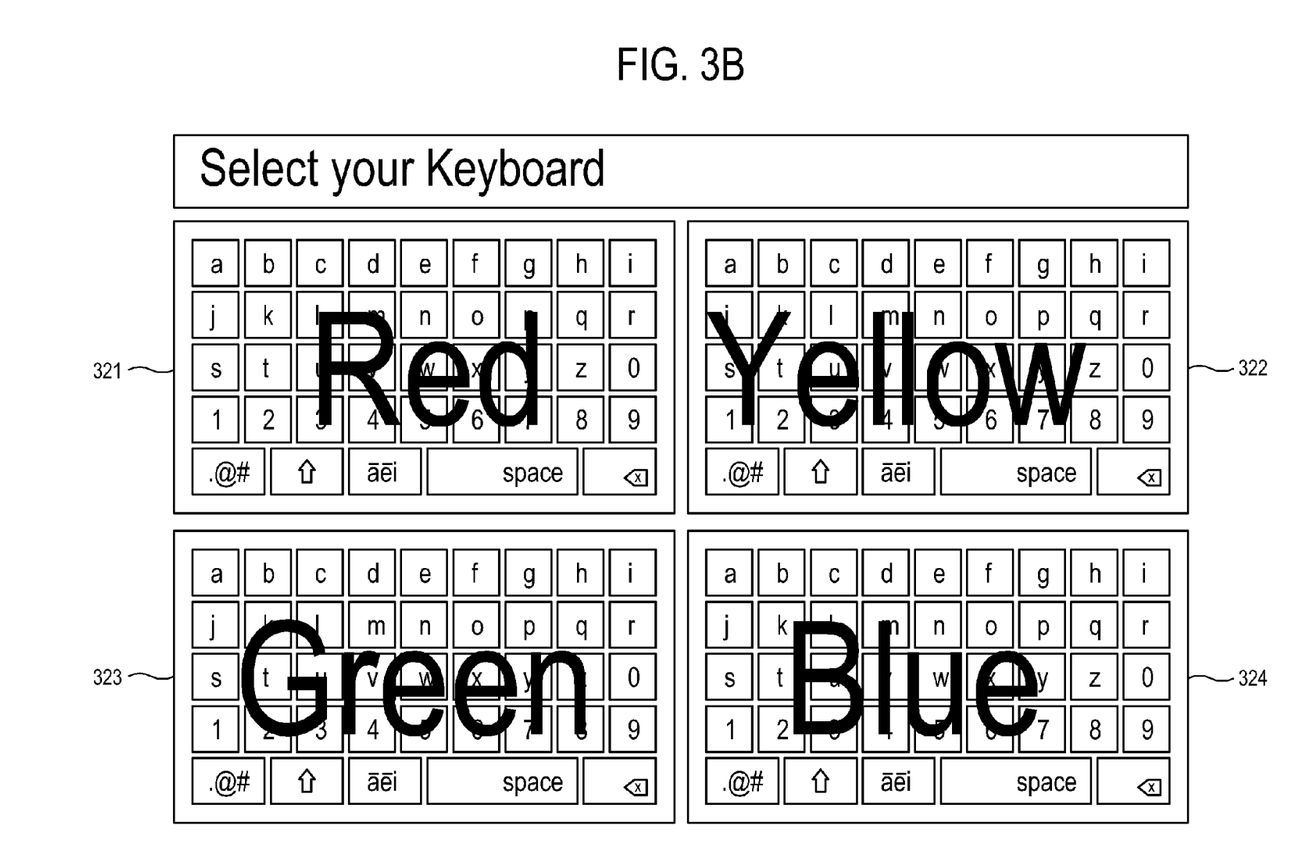
FIG. 3B shows a plurality of password input screens set to be different by a color.

FIG. 3B shows a plurality of password input screens set to be different colors.

The plurality of password input screens may be set to be different colors. For example, as shown in FIG. 3B, the plurality of password input screens may include a red password input screen 321, a yellow password input screen 322, a green password input screen 323, and a blue password input screen 324.

A user may select a selected password input screen for actually inputting a password by selecting a color assigned to one of the plurality of password input screens. Specifically, a user may input a desired color through the input device. The image processing apparatus 200 may set a password input screen having a color corresponding to a user's desired color as a selected password input screen. For example, when a user activates an input with a green key selected from the color keys provided in a remote controller, the green password input screen 323 is set up as the selected password input screen for actually inputting a password.

Figure 3C:
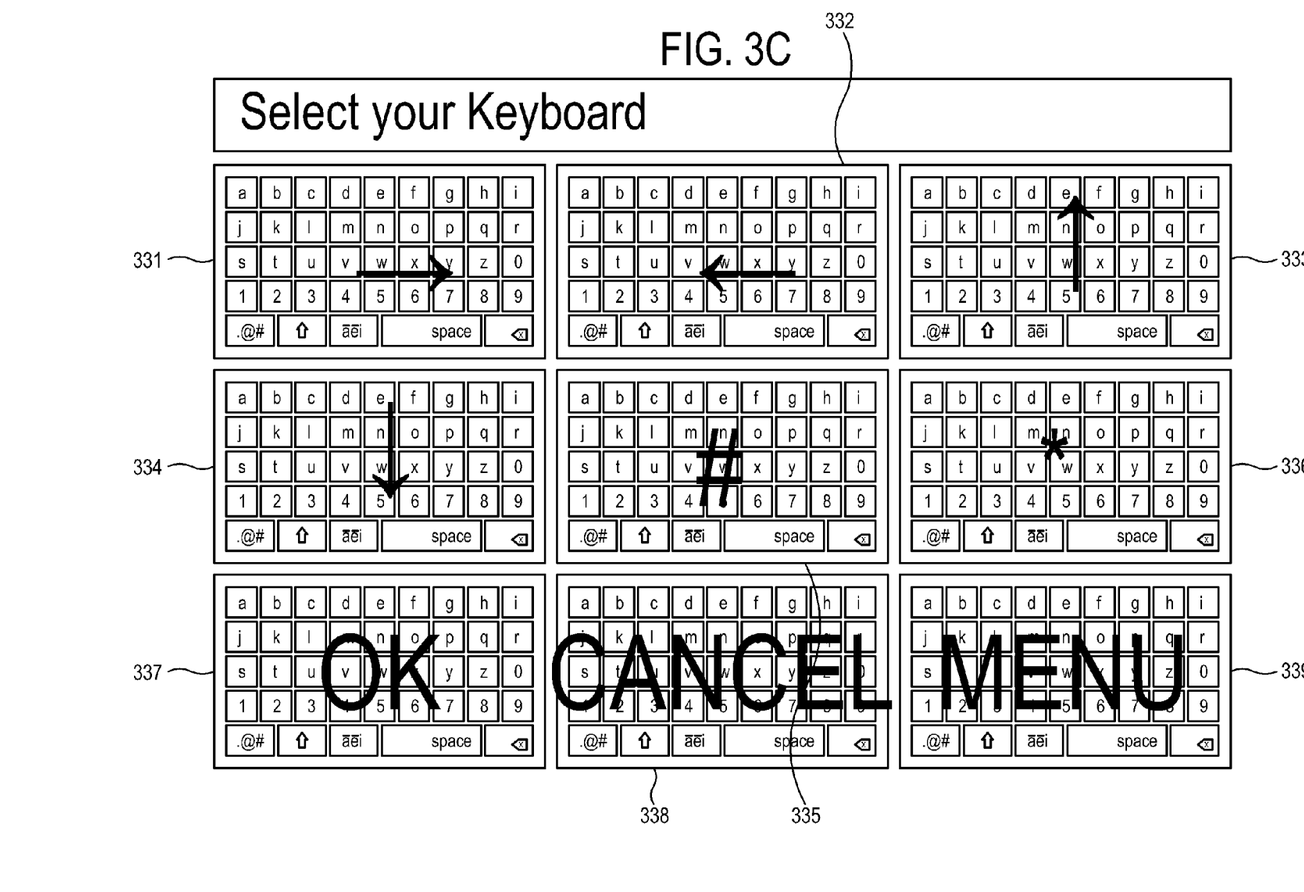
FIG. 3C shows a plurality of password input screens set to be different by a label.

FIG. 3C shows a plurality of password input screens set to have different labels superposed thereon.

The plurality of password input screens may be set to have different labels. The label may include a function key, a character, etc., provided in a remote device. For example, as shown in FIG. 3C, the plurality of password input screens may be assigned with the function keys such as "→," "←," "↑," "↓," "#," "*," "OK," "CANCEL," "MENU," etc.

A user may select a selected password input screen for actually inputting a password by selecting a label assigned to one of the plurality of password input screens. Specifically, a user may input a desired label through the input device. The image processing apparatus 200 may set a password input screen having a label corresponding to a user's desired label as a selected password input screen. For example, when a user activates a function key "OK" selected from among the function keys provided in the remote controller, a password input screen 337 having a label of "OK" is set up as the selected password input screen for actually inputting a password.

Figure 4:
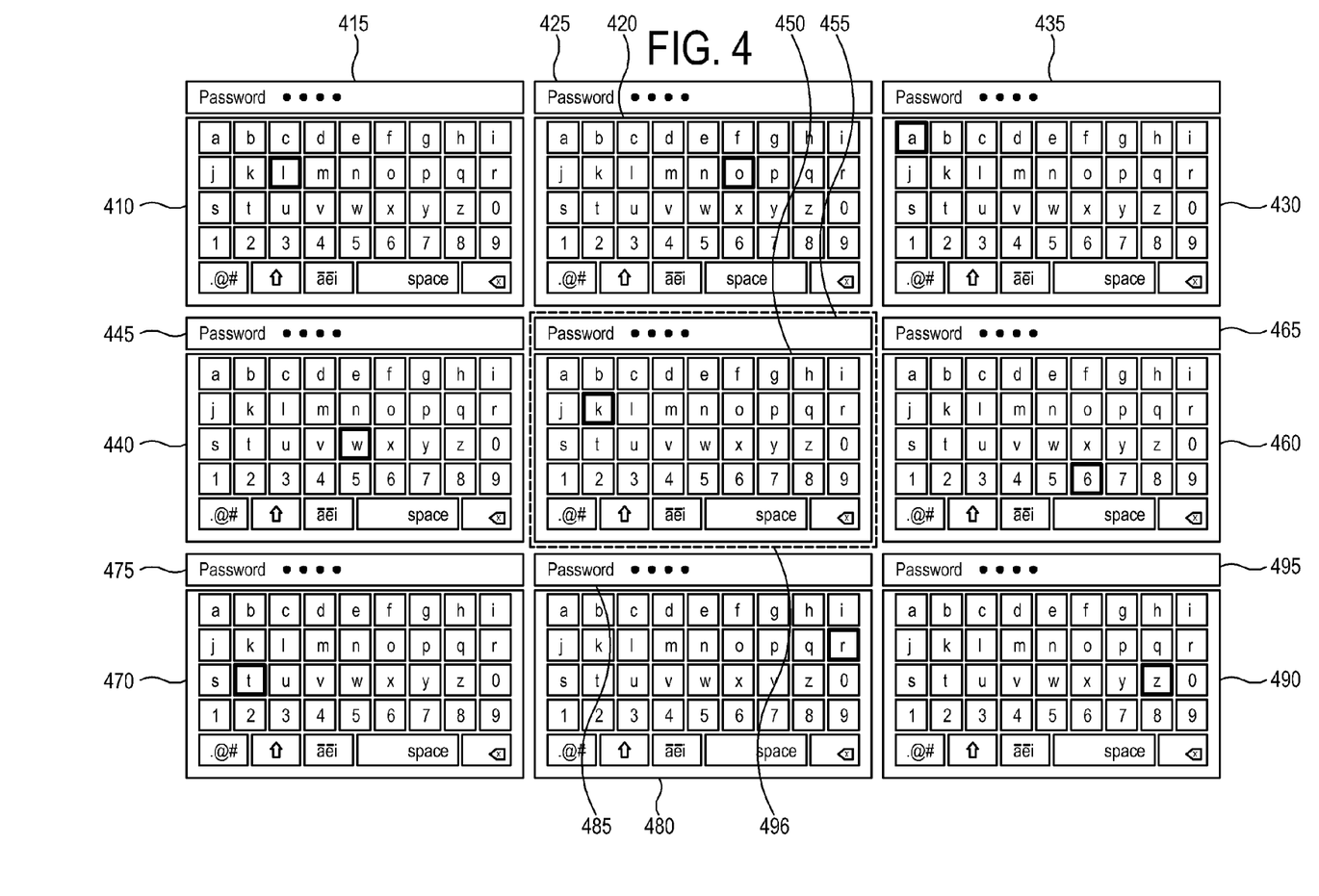
FIG. 4 illustrates a password input method according to an exemplary embodiment.

FIG. 4 illustrates a password input method according to an exemplary embodiment.

In FIG. 4, the image processing apparatus 200 displays the highlights at the position of the key corresponding to a user's selection and at the positions of the random keys.

In the password input method according to an exemplary embodiment, the image processing apparatus 200 may display the plurality of password input screens at the same time. The image processing apparatus 200 may move the highlight displayed on the selected password input screen 496 in response to a user's selection and randomly move the highlight displayed on at least one other password input screen different from the selected password input screen.

Each password input screen may include a plurality of keyboards 410, 420, 430, 440, 450, 460, 470, 480, and 490, and a plurality of input boxes 415, 425, 435, 445, 455, 465, 475, 485, and 495 for displaying the input of the key. The keys displayed in the input box may undergo a masking process so that the input keys may be prevented from being visible to a third party. For example, the symbol "●," "○," or "*" may be displayed instead of the input key. In FIG. 4, the symbol "●" is displayed instead of the input key.

If the selected password input screen 496 for actually inputting a password is a password input screen located in the center among the plurality of password input screens, the image processing apparatus 200 moves the highlight displayed on the keyboard 450 of the selected password input screen 496 in response to a user's selection. Also, the image processing apparatus 200 displays a key selected by a user in the input box 455.

The image processing apparatus 200 may randomly move the highlights displayed on the keyboards 410, 420, 430, 440, 460, 470, 480, and 490 of the other password input screens. Also, the image processing apparatus 200 displays the random keys in the input boxes 415, 425, 435, 445, 465, 475, 485, and 495.

The image processing apparatus 200 may synchronize the displaying time of the key selected by a user with that of the random key. Thus, a third party cannot distinguish the key actually input by a user from the random keys virtually input by the image processing apparatus 200.

Figure 5:
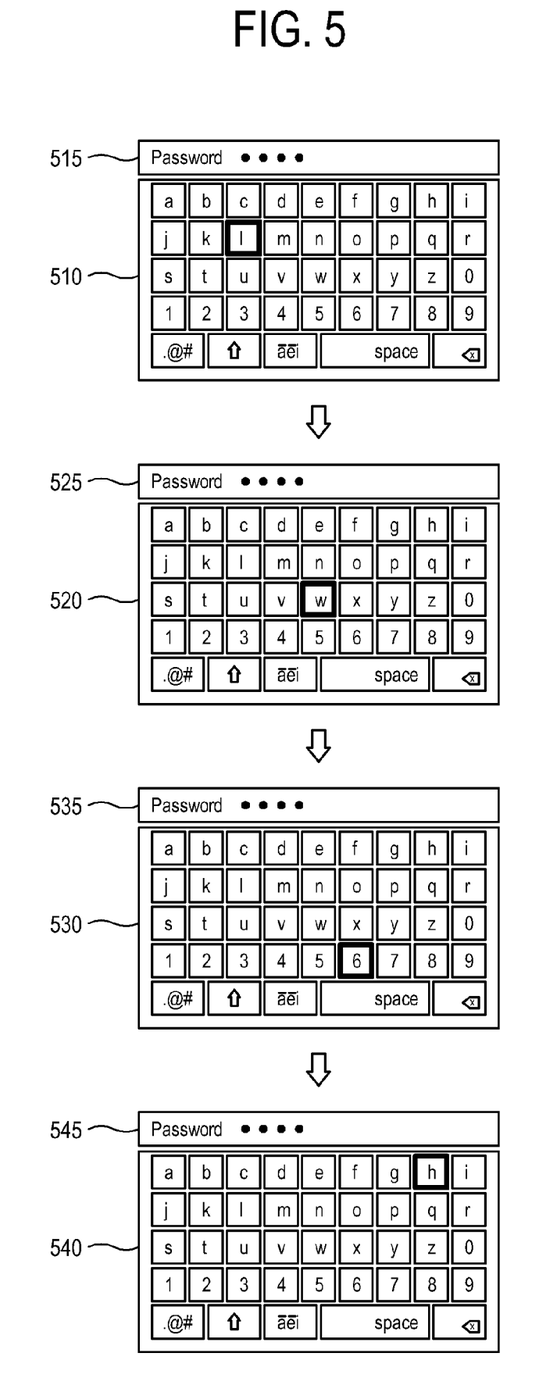
FIG. 5 illustrates a password input method according to another exemplary embodiment.

FIG. 5 illustrates a password input method according to another exemplary embodiment.

In the password input method according to another exemplary embodiment, the image processing apparatus 200 may display the plurality of password input screens in a sequence. The password input screen displayed on the image processing apparatus 200 may be changed in real time. Referring to FIG. 5, the password input screen having a keyboard 510 highlighted at a position of a letter "l," the password input screen having a keyboard 520 highlighted at a position of a letter "w," the password input screen having a keyboard 530 highlighted at a position of a numeral "6," and the password input screen having a keyboard 540 highlighted at a position of a letter "h" are displayed in sequence, one after another. Since the password input screen displayed on the image processing apparatus 200 is changed in real time, there is substantially no probability that a third party identifies the key actually input by a user.

The image processing apparatus 200 may move the highlight displayed on the selected password input screen in response to a user's selection, and randomly move the highlight displayed on at least one other password input screen different from the selected password input screen.

Figure 6:
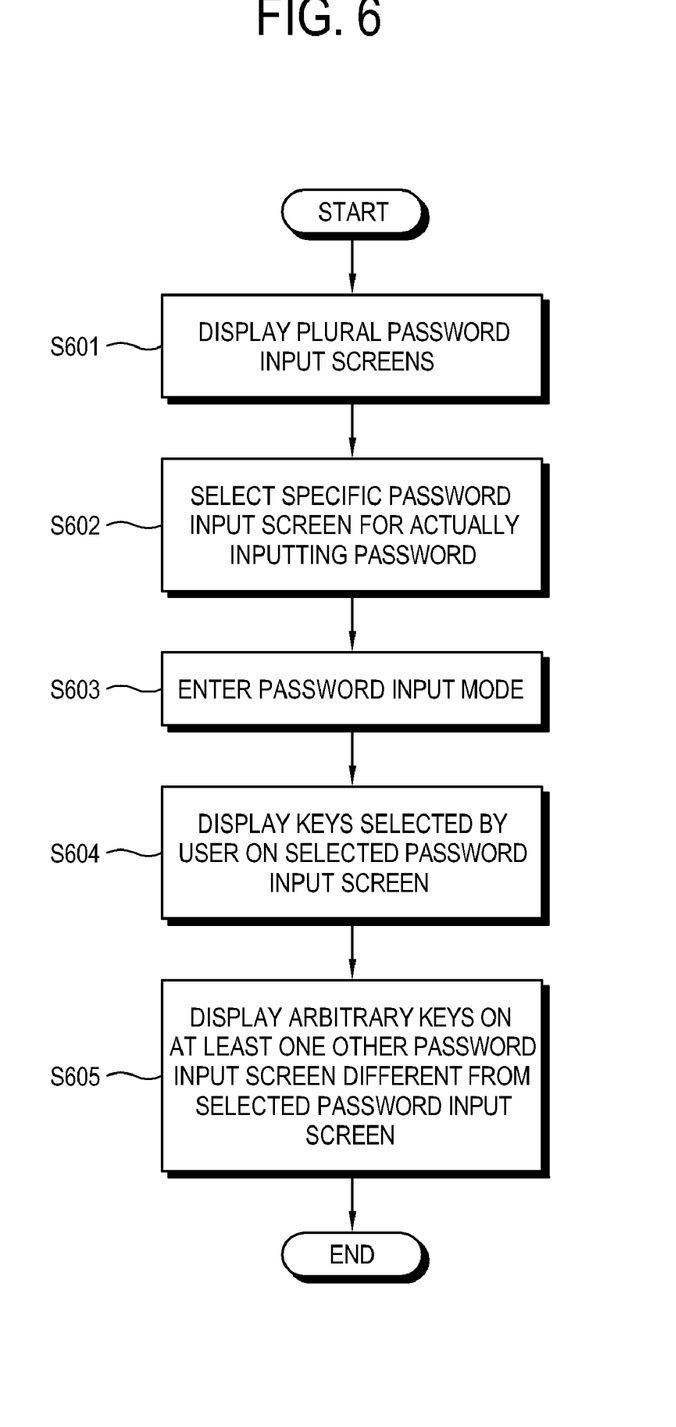
FIG. 6 is a flowchart of an image processing method according to an exemplary embodiment.

FIG. 6 is a flowchart of an image processing method according to an exemplary embodiment.

When a user wants to input a password, the image processing apparatus 200 displays the plurality of password input screens on a screen at operation S601. The password input screen may be a virtual input device such as a screen keyboard, a screen keypad, etc. Also, the password input screen may have a plurality of keys. The image processing apparatus 200 may display the numerals or the labels on the respective password input screens or display the respective password input screens to have different colors, so that a user may easily ascertain the password input screens to be selected from the plurality of password input screens.

At operation S602, the image processing apparatus 200 selects the selected password input screen for actually inputting a password from the plurality of password input screens. Specifically, a user presses a numeral key, a color key, or a function key provided in the input device to select the selected password input screen.

In this procedure, the screen where the plural password input screens are displayed is shared by many users, but the selected password input screen selected at the operation S602 is not visible to the public since is selected by only an account user having the input device.

When the selected password input screen is selected, a mode for selecting the password input screen is changed into a password input mode at operation S603. In the password input mode, the image processing apparatus 200 may display the cursors or the highlights to indicate a current position for inputting the password. The image processing apparatus 200 may display the cursors or the highlights to have different initial positions according to the password input screens. Thus, the cursors or the highlights are displayed at random initial positions.

At operation S604, the image processing apparatus 200 displays a key selected by a user on the selected password input screen.

At operation S605, the image processing apparatus 200 also displays random keys on at least one other password input screen different from the selected password input screen. Specifically, the position of the key moves randomly on the other virtual password input screens in the same manner as the position of the key moves on the selected password input screen. Also, the key inputs randomly on the other virtual password input screens in the same manner as the key inputs on the selected password input screen. The image processing apparatus 200 may synchronize the displaying time of the key selected by a user with that of the random keys.

Thus, a third party who shares the screen with a user cannot identify a currently input password. Further, the keys are randomly arranged on the selected password input screen and the other password input screens, so that a password may be securely input.

Figure 7:
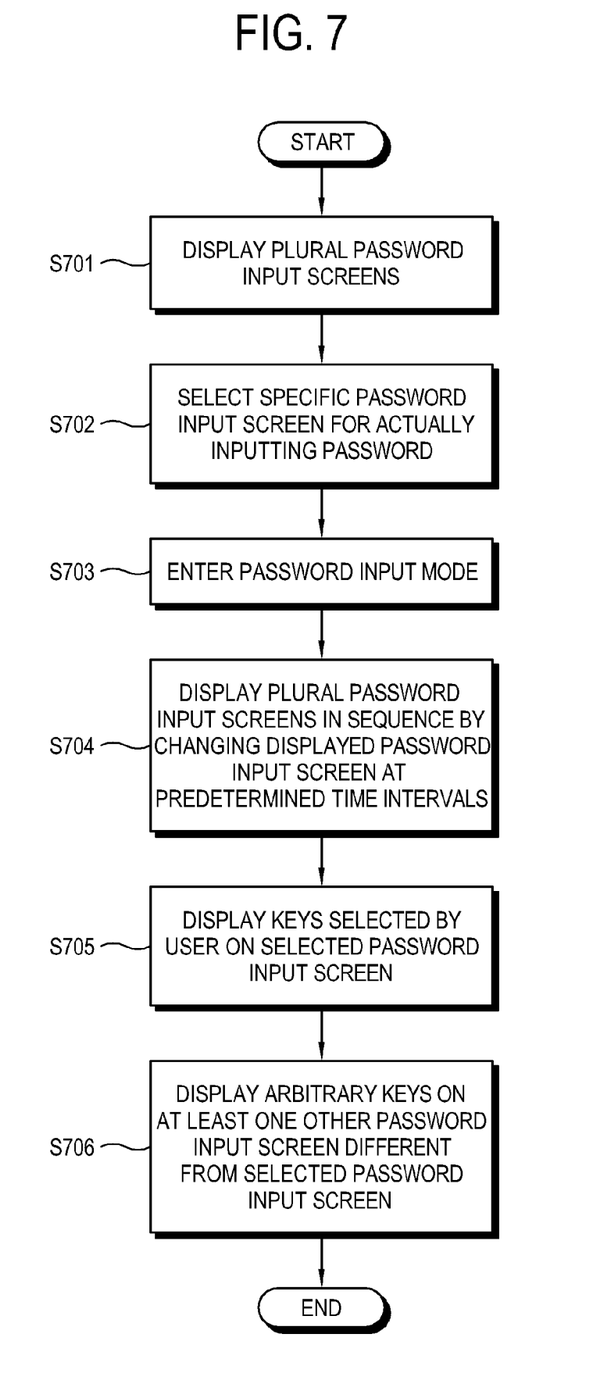
FIG. 7 is a flowchart of an image processing method according to another exemplary embodiment.

FIG. 7 is a flowchart of an image processing method according to another exemplary embodiment.

When a user wants to input a password, the image processing apparatus 200 displays a plurality of password input screens on a screen at operation S701. The image processing apparatus 200 selects a password input screen for actually inputting a password from the plurality of password input screens at operation S702. When the password input screen is selected, a mode for selecting the password input screen is changed into a password input mode at operation S703.

The image processing apparatus 200 displays the plurality of password input screens in a sequence by changing the displayed password input screens at predetermined time intervals at operation S704. At operation S705, the image processing apparatus 200 displays a key selected by user on the selected password input screen. At operation S706, the image processing apparatus 200 displays the random keys on at least one other password input screen different from the selected password input screen.

As described above, users may securely input their account passwords through a limited input device in an environment when a screen is shared by the users, such as, for example, a screen of a TV.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image processing apparatus comprising:
a video processor which processes and displays an image;
a receiver which receives a user's selection; and
a controller which controls the video processor to display a plurality of password input screens each comprising a plurality of keys, display a key corresponding to the user's selection on a selected password input screen which is selected from the plurality of password input screens, and display, in response to receiving the user's selection, a random key on at least one other password input screen from the plurality of password input screens which is different from the selected password input screen,
wherein the controller controls the video processor to display the plurality of password input screens at the same time, and
wherein the controller controls the video processor to synchronize a displaying time of the key corresponding to the user's selection with the displaying time of the random key.

2. The image processing apparatus according to claim 1, wherein the controller controls the video processor to display cursors at a position of the key corresponding to the user's selection and at a position of the random key.

3. The image processing apparatus according to claim 2, wherein the controller controls the video processor to move the cursor displayed on the selected password input screen in response to the user's selection, and to randomly move the cursor displayed on the at least one other password input screen.

4. The image processing apparatus according to claim 2, wherein the controller controls the video processor to display the cursors at different initial positions on the plurality of password input screens.

5. The image processing apparatus according to claim 1, wherein the controller controls the video processor to mask and display the key corresponding to the user's selection and the random key.

6. The image processing apparatus according to claim 1, wherein the controller randomly draws out the random key.

7. The image processing apparatus according to claim 1, wherein the controller controls the video processor to set the plurality of password input screens to be different from one another by at least one of numbers superposed on the plurality of password input screens, colors of the plurality of password input screens, and labels superposed on the plurality of password input screens.

8. The image processing apparatus according to claim 7, wherein the controller sets up one of the plurality of password input screens corresponding to at least one of a color, a number, and a label corresponding to the user's selection as the selected password input screen.

9. An image processing method comprising:
displaying a plurality of password input screens each comprising a plurality of keys;

receiving a user's selection;

displaying a key corresponding to the user's selection among the plurality of keys on a selected password input screen; and displaying, in response to receiving the user's selection, a random key on at least one other password input screen from the plurality of password input screens which is different from the selected password input screen, wherein the plurality of password input screens is displayed at the same time, and wherein a displaying time of the key corresponding to the user's selection is synchronized with the displaying time of the random key.

10. The image processing method according to claim 9, further comprising:

displaying cursors at a position of the key corresponding to the user's selection and at a position of the random key.

11. The image processing method according to claim 10, wherein the cursor displayed on the selected password input screen is moved in response to the user's selection, and the cursor displayed on the at least one other password input screen is moved randomly.

12. The image processing method according to claim 10, wherein the cursors are displayed to have different initial positions on the plurality of password input screens.

13. The image processing method according to claim 9, wherein the key corresponding to the user's selection and the random key are masked and displayed.

14. The image processing method according to claim 9, wherein the random key is randomly drawn out.

15. The image processing method according to claim 9, wherein the plurality of password input screens are set up to be different from one another by at least one of numbers superposed on the plurality of password input screens, colors of the plurality of password input screens, and labels superposed on the plurality of password input screens.

16. The image processing method according to claim 15, further comprising:

receiving the user's selection indicating one of a number, a color, and a label; and setting up one of the plurality of password input screens corresponding to at least one of the color, the number, and the label corresponding to the user's selection as the selected password input screen.

* * * * *